United States Patent
Hawkinson (10) Patent No.: US 7,522,090 B2
(45) Date of Patent: Apr. 21, 2009

(54) SYSTEMS AND METHODS FOR A TERRAIN CONTOUR MATCHING NAVIGATION SYSTEM

(75) Inventor: Wesley J. Hawkinson, Chanhassen, MN (US)

(73) Assignee: Honeywell International Inc., Morristown, NJ (US)

( * ) Notice: Subject to any disclaimer, the term of this patent is extended or adjusted under 35 U.S.C. 154(b) by 140 days.

(21) Appl. No.: 11/554,802

(22) Filed: Oct. 31, 2006

(65) Prior Publication Data

US 2008/0169964 A1 Jul. 17, 2008

(51) Int. Cl.
G01S 13/00 (2006.01)
G01S 7/40 (2006.01)
B29C 45/00 (2006.01)
G06F 19/00 (2006.01)
G06F 7/00 (2006.01)

(52) U.S. Cl. .................. 342/64; 342/63; 342/173; 342/174; 701/200; 701/207; 701/223

(58) Field of Classification Search ............. 342/61–65, 342/175, 189, 195, 173, 174; 701/3, 4, 7, 701/8, 200, 300, 301
See application file for complete search history.

(56) References Cited

U.S. PATENT DOCUMENTS

| | | | | |
|---|---|---|---|---|
| 3,328,795 A | * | 6/1967 | Hallmark | 342/64 |
| 4,144,571 A | * | 3/1979 | Webber | 701/217 |
| 4,495,580 A | * | 1/1985 | Keearns | 701/217 |
| 5,559,518 A | * | 9/1996 | DiDomizio | 342/174 |
| 6,005,581 A | * | 12/1999 | Gjullin | 345/582 |
| 6,218,980 B1 | * | 4/2001 | Goebel et al. | 342/64 |
| 6,492,944 B1 | * | 12/2002 | Stilp | 342/387 |
| 6,738,563 B1 | * | 5/2004 | Hager et al. | 342/147 |
| 6,755,373 B1 | * | 6/2004 | Moore | 244/3.17 |
| 6,803,878 B2 | * | 10/2004 | Hager et al. | 342/173 |

OTHER PUBLICATIONS

Seeing in three dimensions: correlation and triangulation of Mars Exploration Rover imagery Deen, R.G.; Lorre, J.J.; Systems, Man and Cybernetics, 2005 IEEE International Conference on vol. 1, Oct. 10-12, 2005 pp. 911-916 vol. 1.*

* cited by examiner

Primary Examiner—Thomas H Tarcza
Assistant Examiner—Peter M Bythrow
(74) Attorney, Agent, or Firm—Fogg & Powers LLC (57) ABSTRACT

Systems and methods for terrain contour matching navigation are provided. In one embodiment, a method for terrain contour matching navigation comprises: receiving at least one sample point representing the position of an aircraft, the at least one sample point including a horizontal position and an altitude sample; correlating a first sample point of the at least one sample point across a reference basket array having a plurality of elements; determining a correlation quality; when the correlation quality does not achieve a pre-determined quality threshold, performing at least one additional correlation of an additional sample point of the at least one sample point across the reference basket array; and when the correlation quality does achieve a pre-determined quality threshold, calculating a position error based on the correlating of the first sample point and any additional correlations of any additional sample points.

19 Claims, 4 Drawing Sheets

SYSTEMS AND METHODS FOR A TERRAIN CONTOUR MATCHING NAVIGATION SYSTEM

BACKGROUND

Unmanned aircraft often use a terrain contour matching (TERCOM) navigation system that compares altitude samples with an on-board contour map of the terrain to determine the aircrafts position. A typical TERCOM navigation system first collects a sequence of altitude samples measured by devices such as a radar altimeter or laser altimeter. The altitude samples are then assembled into a two-dimensional array that associates a horizontal position (e.g. a longitude and latitude) with each of the altitude samples. The TERCOM navigation system also includes a contour map of a region of terrain that associates altitudes with two-dimensional horizontal positions. The TERCOM navigation system establishes a first reference point that represents the aircraft's position based on the two-dimensional array, while establishing a second reference point that represents the aircraft's position based on the contour map. The TERCOM navigation system then correlates a selected area from the contour map (hereinafter referred to as the selected reference basket) across the entire sequence of altitude samples to achieve a best fit solution. The aircraft's position error is then determined based on any resulting delta between the first and second reference points. If there is no position error, then the first and second reference points will correspond to the same point from the best fit solution. If the aircraft is off in one or both of the latitude direction or the longitude direction, there will be a corresponding offset between the reference points.

As previously mentioned, the traditional TERCOM navigation system correlates the reference map across the entire sequence of altitude samples to achieve a best fit solution. This traditional TERCOM technique results in two problems. First, to calculate the position error using a correlation algorithm, the TERCOM navigation system must batch process the entire sequence of altitude samples at once. This batch processing of the sample points results in significant processor loading while the algorithm is executed, and further results in a delay (2-3 seconds, for example) before a position error estimate is available to the aircraft for making any required course correction. Second, the portion of the contour map used to perform the correlation must be pre-selected based on a pre-flight plan. If the reference map is too large, the correlation algorithm will waste time and processor resources needlessly calculating a best fit solution for areas of the terrain that are not relevant. If the reference map is too small, the correlation algorithm may not converge on a best fit solution. Therefore, the size of the reference map is largely based on the expected position error. The greater the expected error, the larger the correlation area provided by the reference map needs to be. The less the expected error, the smaller the correlation area provided by the reference map needs to be. One additional factor that must also be considered in selecting the size of reference map is the expected terrain slope variation. The terrain slope variation dictates how much information is provided by an area of terrain. For example a terrain comprising mostly desert is relatively smooth and provides limited variations in terrain slope. Thus one area of the desert terrain's surface provides little information to distinguish it from another. In contrast, a mountainous terrain provides many variations in terrain slope. One area of the mountainous terrain's surface is less likely to be duplicated by another area and thus provides more information than a similarly sized area of desert terrain. Accordingly, a reference map covering a desert terrain must be relatively larger than a reference map covering a mountainous terrain in order for the correlation algorithm to be sure to converge on a best fit solution. For this reason, these traditional TERCOM navigation systems must be pre-programmed with a predetermined flight plan in order to know the type of terrain the aircraft will fly over and thus select the correct size reference map for correlating.

For the reasons stated above and for other reasons stated below which will become apparent to those skilled in the art upon reading and understanding the specification, there is a need in the art for improved systems and methods for TERCOM navigation.

SUMMARY

The Embodiments of the present invention provide methods and systems for improved systems and methods for TERCOM navigation and will be understood by reading and studying the following specification.

Systems and methods for terrain contour matching navigation are provided. In one embodiment, a method for terrain contour matching navigation comprises: receiving at least one sample point representing the position of an aircraft, the at least one sample point including a horizontal position and an altitude sample; correlating a first sample point of the at least one sample point across a reference basket array having a plurality of elements; determining a correlation quality; when the correlation quality does not achieve a pre-determined quality threshold, performing at least one additional correlation of an additional sample point of the at least one sample point across the reference basket array; and when the correlation quality does achieve a pre-determined quality threshold, calculating a position error based on the correlating of the first sample point and any additional correlations of any additional sample points.

BRIEF SUMMARY OF THE DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Figure 1:
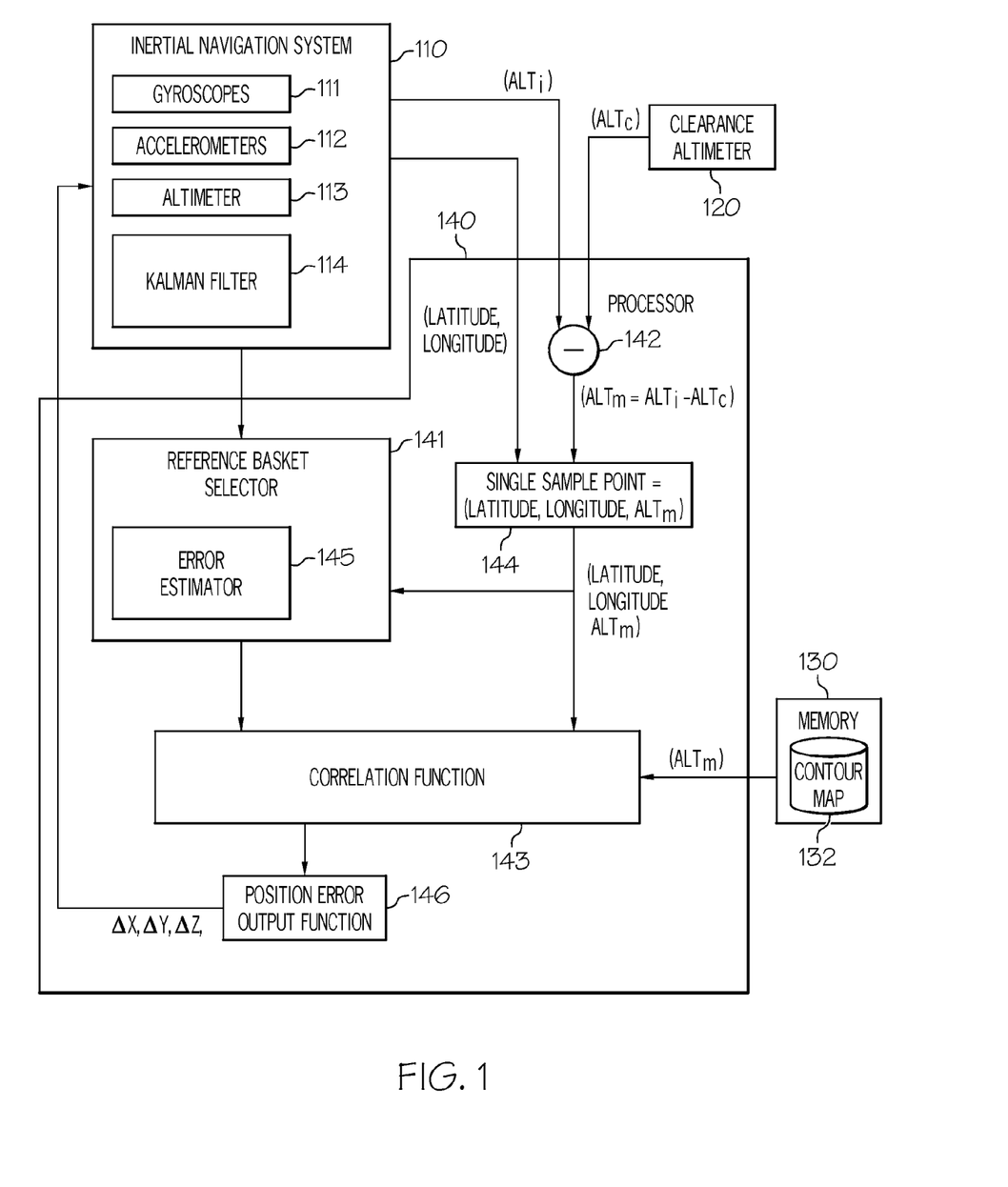
FIG. 1 is a block diagram illustrating an improved TERCOM navigation system of one embodiment of the present invention.

FIG. 1 is a block diagram illustrating an improved TERCOM navigation system 100 for an aircraft 101 of one embodiment of the present invention. TERCOM navigation system 100 comprises a inertial navigation system 110, a clearance altimeter 120 and a memory 130, each coupled to a processor 140. Inertial navigation system 110 comprises one or more gyroscopes 111, one or more accelerometers 112, and an altimeter 113. Based on measurements provided by the one or more gyroscopes 111, one or more accelerometers 112, and an altimeter 113, inertial navigation system 110 produces and outputs a navigation solution that includes a two-dimensional (in terms of longitude and latitude, for example) horizontal position of the aircraft 101 and a vertical inertial altitude of the aircraft 101 (shown as $Alt_i$) in units of distance above a reference surface. The reference surface could include a theoretical surface, such as but not limited to an average or mean sea level, for example. In the embodiment shown in FIG. 1, inertial navigation system 110 further comprises a Kalman filter 114. As would be appreciated by one of ordinary skill in the art, a Kalman filter as used in a navigation system is a filter algorithm implemented in a digital computer system that acts to filter and blend data from navigation sensors having varying degrees of accuracy, in order to establish an optimal estimate of an aircraft's navigation state. In inertial navigation system 110, Kalman filter 114 receives inertial data from gyroscopes 111, accelerometers 112, and altimeter 113, calculates an estimate of the aircraft's navigation state, which is provided as inertial navigation system 100's navigation solution, and also calculates error estimates associated with the navigation solution output.

Clearance altimeter 120 measures the distance between the aircraft 101 and the surface of the terrain (not shown) over which the aircraft 101 is flying. The distance is typically referred to as the aircraft's clearance altitude and is illustrated in FIG. 1 as $Alt_c$. In alternate embodiments, clearance altimeter 120 may comprise a radar altimeter, a laser altimeter or a combination of the two. In other embodiments, other means for determining the clearance altitude ($Alt_c$) may be used to implement clearance altimeter 120.

Memory 130 is a memory device programmed with a contour map 132 of the terrain over which the aircraft 101 travels. The contour map 132 comprises an array of values that provides the altitude of a point located at a specific horizontal position on the terrain.

Processor 140 receives the latitude, longitude and inertial altitude ($Alt_i$) navigation solution data from inertial navigation system 110 and the clearance altitude ($Alt_c$) from clearance altimeter 120. Subtracting the clearance altitude ($Alt_c$) from the inertial altitude ($Alt_i$) (shown at 142), processor 140 calculates an estimated altitude of the surface of the terrain above the reference surface (shown in FIG. 1 as altitude sample $Alt_m$). For example, in one embodiment, the altitude sample $Alt_m$ represents an estimate of the terrain's surface above sea level at a specific latitude and longitude. The $Alt_m$, calculated for a specific latitude and longitude, along with those latitude and longitude values define what is referred to herein as a single sample point, shown in FIG. 1 at 144 as (latitude, longitude, $Alt_m$).

Processor 140 further comprises a reference basket selector 141. The reference basket, as that term is used in this application, is an area of the surfaced terrain under the aircraft 101, as mapped by the contour map in memory 130, that includes the longitude and latitude point provided by inertial navigation system 110 and also includes an area around that point based on the uncertainty in the longitude and latitude information. For example, if the predicted uncertainty is +/−50 meters in the longitude direction and +/−100 meters in the latitude direction, reference basket selector 142 selects a reference basket from the contour map in memory 130 that includes at least the longitude and latitude point and all points in the area of the rectangle formed from 50 meters north to 50 meters south of the longitude and 100 meters east to 100 meters west of the latitude. The reference basket selector 141 then provides the reference basket location and size to correlation function 143.

In one embodiment, reference basket selector 141 includes and error estimator 145 that determines the uncertainty in the longitude and latitude information provided by inertial navigation system 110. As shown in the embodiment of FIG. 1, error estimator 145 receives an estimator quality signal from Kalman filter 114 and determines an uncertainty in the longitude and latitude information based on error estimates calculated by Kalman filter 114. In other embodiments, error estimator 145 determines the uncertainty in the longitude and latitude information from inertial navigation system 110 using a constant assumed error which is based on known error characteristics of the equipment used to implement inertial navigation system 110.

Based on the reference basket location and size information, correlation function 143 selects a reference basket array from the contour map 132 in memory 130. The reference basket array comprises an array having elements populated by altitude ($Alt_m'$) values for each longitude and latitude point located within the reference basket area determined by reference basket selector 142. In one embodiment, where the reference basket area is rectangular in shape, the reference basket array is an array having dimensions of x elements by y elements. In other embodiments, other reference basket area shapes are contemplated as within the scope of the present invention.

Correlation function 143 correlates the sample point (latitude, longitude, $Alt_m$) over the entire area of the reference basket (that is, it correlates the sample point against each element in the reference basket array). As explained in greater detail below, the result of this correlation enables navigation system 100 to determine any differences between the horizontal position of aircraft 101 as provided by inertial navigation system 110 and the horizontal position of aircraft 101 as indicated by the contour map 132. These differences are computed by processor 140 using position error output function 146. In operation, correlation function 143 correlates a sample point against the reference basket array and identifies an element within the reference basket array corresponding to a smallest computed correlation value. Two methods for computing the correlation value include the minimum variance technique (described below with respect to FIG. 2) and the minimum absolute deviation technique (described below with respect to FIG. 4). One of ordinary skill in the art upon reading this specification would appreciate that other correlation techniques may be used in other embodiments. If the result of the correlation indicates that the correlation is not of sufficient quality (discussed in greater detail below), correlation function 143 inputs additional sample points, one at a time as required, sequentially correlating each sample point against the same reference basket array until a correlation of sufficient quality is achieved. When a correlation of sufficient quality is achieved, position error output function 146 calculates horizontal position errors $\Delta x$ and $\Delta y$, and vertical position error $\Delta z$ based on the element within the reference basket array corresponding with the smallest computed correlation value. A method of one embodiment of the present invention for calculating horizontal position errors $\Delta x$ and $\Delta y$, and vertical position error $\Delta z$ is described below with respect to FIG. 3.

Figure 2:
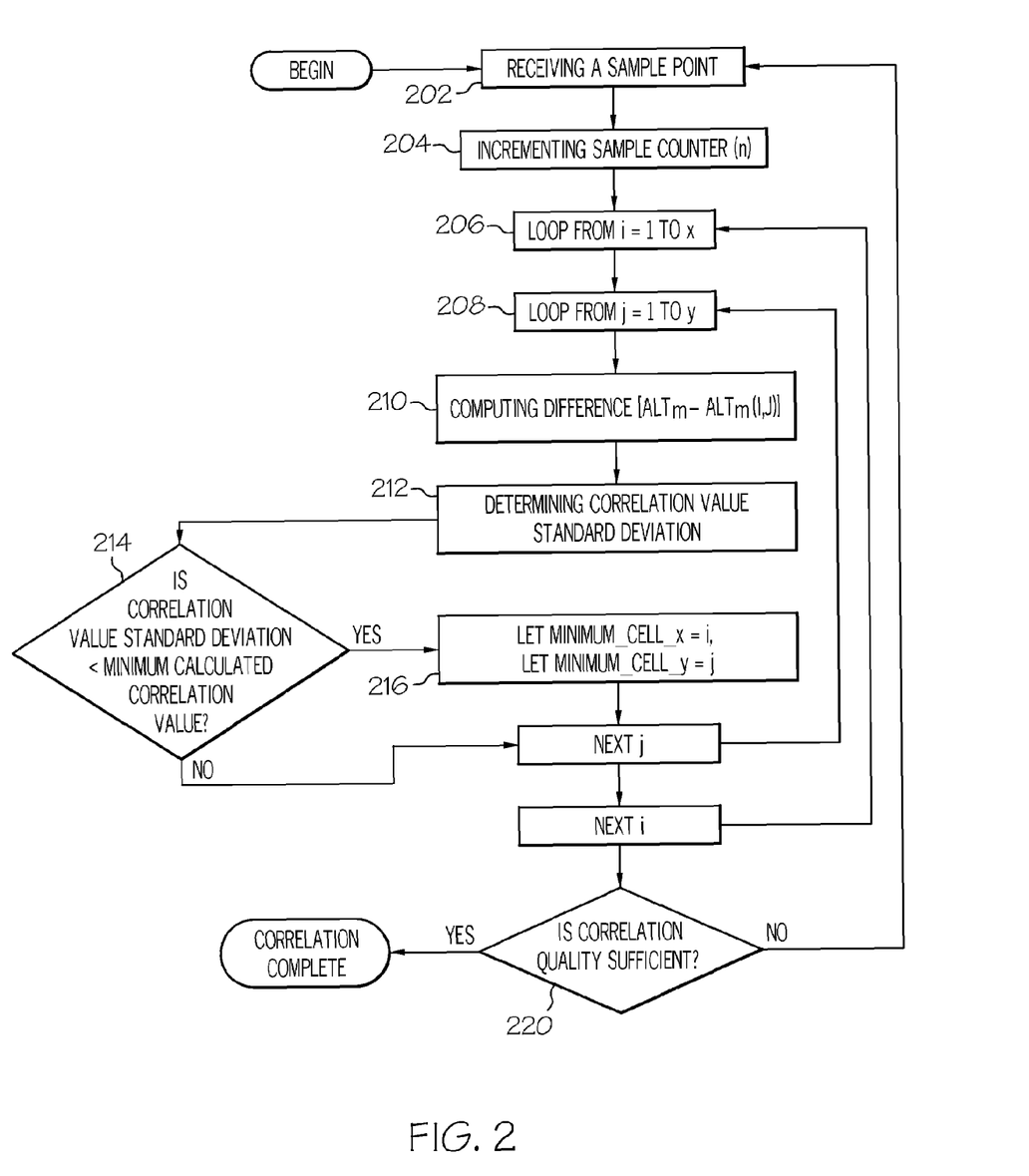
FIG. 2 is a flow chart illustrating a method of one embodiment of the present invention.

FIG. 2 is a flow chart illustrating a method of one embodiment of the present invention that correlates a sample point against the area of a reference basket as represented by a reference basket array. In one embodiment, the method of FIG. 2 is implemented by correlation function 143. Using a "minimum variance" technique, the method of FIG. 2 determines the difference between the $Alt_m$ value of the sample point and the $Alt_m'$ values contained in the reference basket array, and subsequently identifies the element having the minimum standard deviation within the reference basket array. The element having the minimum standard deviation corresponds to a predicted navigator position (that is, a most probable navigator position) relative to the reference basket area. It is understood that the method of FIG. 2 illustrates just one of many possible algorithms for identifying a predicted navigator position based on minimum variance that are embodied within the claims of the present invention.

The method begins at 202 with receiving a sample point (latitude, longitude, $Alt_m$) and incrementing a sample point counter (n) by one (shown at 204). The method implements two indexing loops that step the method through each element of a rectangular reference basket array having dimensions of x elements by y elements. It would be appreciated by one of ordinary skill in the art upon reading this specification that in embodiment utilizing non-rectangular reference basket shapes, other ways are available for stepping the method through each element of the non-rectangular reference basket array representing the non-rectangular reference basket.

The first loop (shown starting a block 206) steps the method by increasing index value i from 1 to x, where x is equal to the number of columns of the reference basket array. The second loop (shown starting a block 208) steps the method by increasing index value j from 1 to y, where y is equal to the number of rows of the reference basket array. The method proceeds to 210 with computing the difference between the value of $Alt_m'(i,j)$ of the reference basket array and the $Alt_m$ value from the sample point received at block 202 (shown as difference[$Alt_m - Alt_m'(i,j)$] in block 210).

The method of FIG. 2 performs a sequential computation at block 212 to determine a correlation value standard deviation for each element of the reference basket array. In one embodiment, at 212, the method calculates the values difference_sum(i,j)=difference_sum(i,j)+difference[$Alt_m - Alt_m'(i,j)$], difference_sum_squared(i,j)=difference_sum_squared(i,j)+ difference[$Alt_m - Alt_m'(i,j)$]*difference[$Alt_m - Alt_m'(i,j)$], and correlation_value_standard_deviation(i,j)= (difference_sum_squared(i,j)−difference_sum (i,j)*difference_sum(i,j))/n)/n, where n equals the current value of the sample point counter (shown at 204).

The minimum correlation value standard deviation calculated corresponds to the predicted (that is, the most probable) navigator position relative to the reference basket area. Accordingly, the method of FIG. 2 proceeds to 214 with determining whether the correlation_value_standard_deviation(i,j) value for the current index position (i,j) is the minimum value calculated so far. In one embodiment, when the correlation_value_standard_deviation(i,j) value for the current index position (i,j) is the minimum value calculated so far, the method sets the value of variable minimum_cell_x equal to the current value of i, and the value of variable minimum_cell_y equal to the current value of j (shown at block 216). The method then loops back to 208 and 206, incrementing the index values of j and i, respectively and repeating steps 210, 212, 214 and 216 until the loops are completed.

Figure 3:
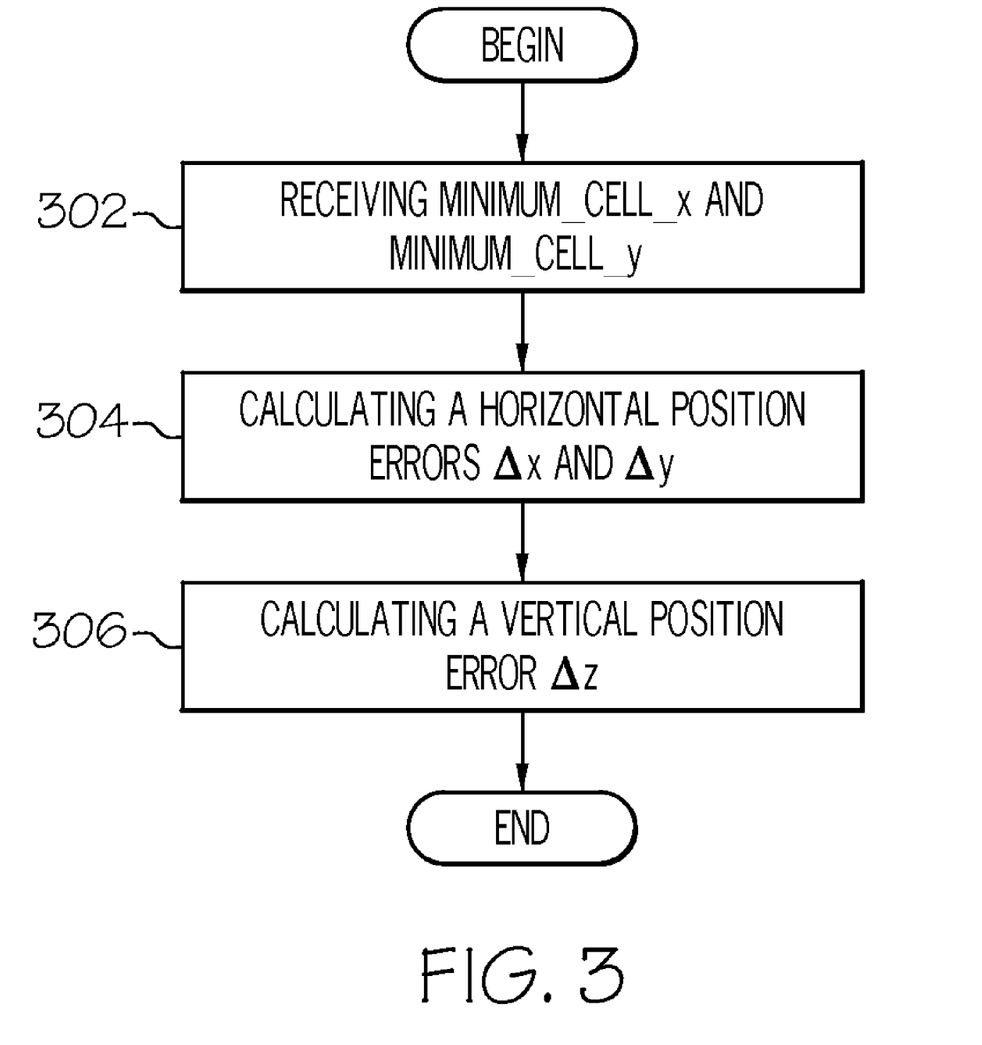
FIG. 3 is a flow chart illustrating a method of one embodiment of the present invention.

After completing the first and second loops, the resulting values of minimum_cell_x and minimum_cell_y identify the elements of the reference basket array that most probably represents the navigator position relative to the reference basket area, based on the correlation of n sample points. Whether these resulting values should be used for computing a position error depends on the quality of the correlation. If the correlation quality is sufficient (determined at block 220) then the values of minimum_cell_x and minimum_cell_y are used to calculate a position error as shown in FIG. 3 and discussed in further detail below. If the correlation quality is not sufficient, then further correlation with another sample point is required. The method begins at 202 with receiving another sample point (latitude, longitude, $Alt_m$), incrementing the value of n by one (at 204) and repeating the process of loops 206 and 208. Note that the same reference basket area and reference basket array are used for calculation of the first, second, and any subsequent correlations until a satisfactory correlation is achieved. Further, the values of difference_sum (i,j) and difference_sum_squared(i,j) are not reset until a satisfactory correlation is achieved. Whether a particular correlation is of satisfactory quality is readily determined by one of ordinary skill in the art upon reading this specification based on the particular accuracy required to satisfy the goals and mission of the aircraft 101. As previously discussed, the terrain slope variation plays a role in how much information is provided by an area of terrain. A terrain comprising mostly smooth desert provides limited variations in terrain slope and may require several sample points before achieving a correlation of satisfactory quality. In contrast, a mountainous terrain provides many variations in terrain slope and would be expect to achieve a correlation of satisfactory quality with relatively fewer sample points.

It would be appreciated by one of ordinary skill in the art that several techniques are available to determine the quality of the correlation achieved by the method of FIG. 2. For example, in one embodiment, a correlation of sufficient quality is deemed to be achieved when the minimum calculated correlation_value_standard_deviation(i,j) achieves a predetermined threshold. In an alternate embodiment, an x by y array comprising the values of correlation_value_standard_deviation(i,j) defines a "correlation surface" that represents the quality of the correlation achieved by the method of FIG. 2. A minimum point in the surface will develop in a region around the values of i and j corresponding to the values of minimum_cell_x and minimum_cell_y for each correlation. A correlation of sufficient quality is deemed to be achieved when the slope of the region around the minimum point achieves a predetermined threshold.

In one embodiment, when a correlation of sufficient quality is achieved, the results of the correlation are used to calculate a position error. FIG. 3 is a flow chart illustrating a method of one embodiment of the present invention for calculating a position error based on the results of a correlation, of one embodiment of the present invention. In one embodiment, the method of FIG. 3 is implemented by a position error output function 146 as shown in FIG. 1. The method begins at 302 with receiving the values of minimum_cell_x and minimum_cell_y from a correlation, when a correlation of sufficient quality is achieved, which correspond with the elements of the reference basket array that most probably represents the navigator position relative to the reference basket area. Using the values of minimum_cell_x and minimum_cell_y, the method determines the horizontal position error in the two dimensions of x and y. Although x and y may be in the form of latitude and longitude values, other coordinate reference frames may be utilized. Accordingly, the method proceeds to 304 with calculating the horizontal position error. In one embodiment, the horizontal position error is calculated using the formula $\Delta x$=(minimum_cell_x−(x+1)/2)*basket_cell_size_x and $\Delta y$=(minimum_cell_y−(y+1)/2)*basket_cell_size_y, where x is equal to the number of columns of the reference basket array, y is equal to the number of rows of the reference basket array, and basket_cell_size_x and basket_cell_size_y are the physical dimensions of the area, in the x and y directions, represented by a single element of the reference basket array. The correlation method of that produces the minimum_cell_x and minimum_cell_y values also provides sufficient information for calculating a vertical position error $\Delta z$, that represents a position error in terms of altitude. To calculate the vertical position error, the method proceeds to 306. In one embodiment, the vertical position error is calculated using the formula $\Delta z$=difference_sum(minimum_cell_x, minimum_cell_y)/n, where n equals the final value of the sample point counter from the correlation. In other words, n equals the number of samples points that were required to achieve a correlation of sufficient quality.

In one embodiment, the $\Delta x$, $\Delta y$ and $\Delta z$ position errors calculated by position error output function 146 using the method of FIG. 3 are provided to inertial navigation system 110 as correction factors to increase the accuracy of the navigation solution provided by inertial navigation system 110.

As previously discussed, one alternate to the minimum variance correlation technique (described in FIG. 2) is the minimum absolute deviation (MAD) correlation technique. The MAD correlation technique involves subtracting a constant (representing a bias) from the difference between the $Alt_m$ value of the sample point and the $Alt_m$' values contained in the reference basket array and taking the absolute value of the result. A running sum of the result is kept for each cell in the basket area, and the element having the minimum value at the end of the correlation corresponds to the predicted (that is, the most probable) navigator position relative to the basket area. As with the method of FIG. 2, the correlation one or more sample points may be required to achieve a correlation of sufficient quality to subsequently calculate $\Delta x$, $\Delta y$ and $\Delta z$ position errors. The constant represents the sum of any sensor bias, any bias is the value of $Alt_m$ and any bias in the $Alt_m$' values contained in the reference basket array. In one embodiment, the bias constant is computed from known values of these biases. In another embodiment, the bias constant used in the method of FIG. 4 can be derived from a previously performed minimum variance correlation, such as shown in FIG. 2, which is insensitive to biases.

Figure 4:
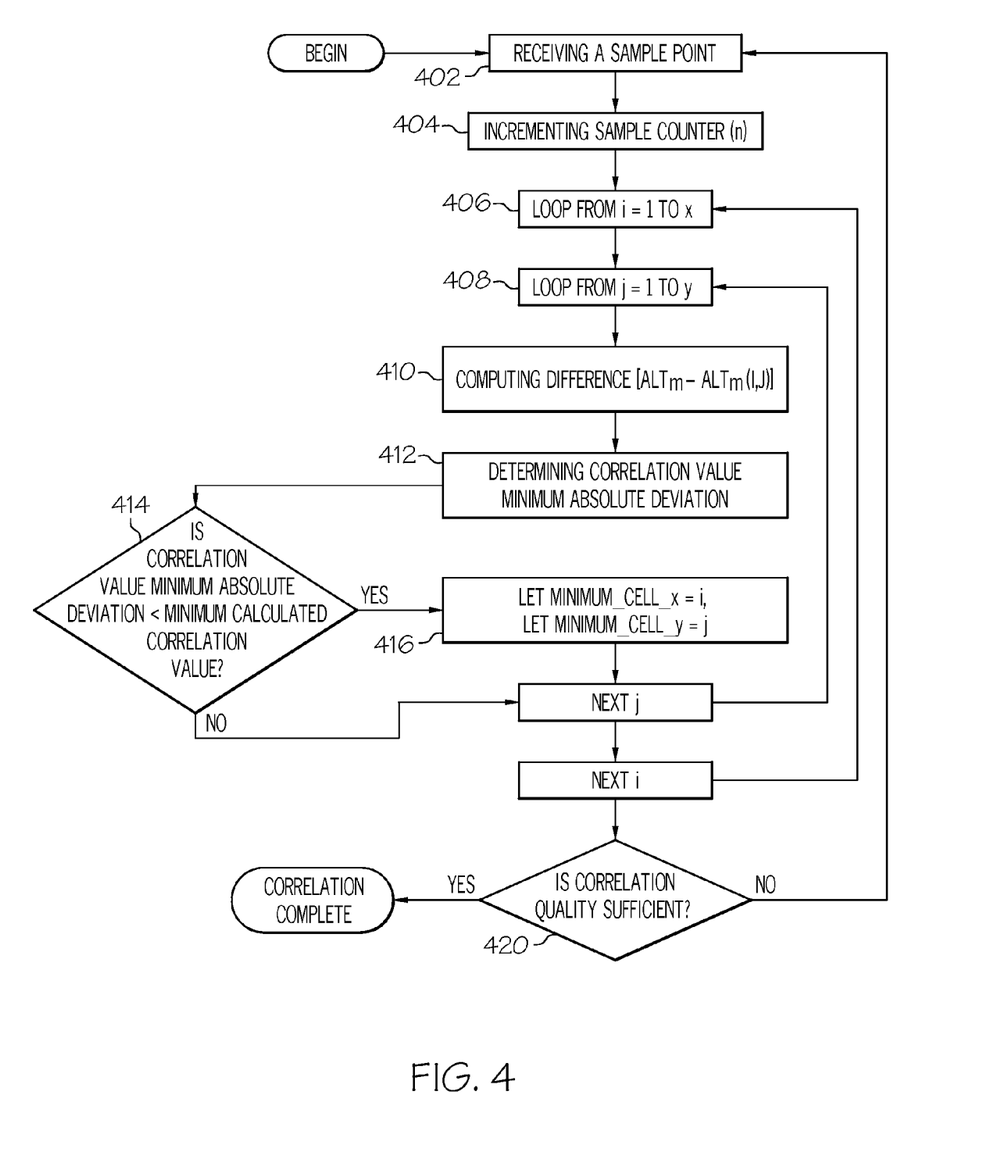
FIG. 4 is a flow chart illustrating a method of one embodiment of the present invention.

FIG. 4 is a flow chart illustrating a method of one embodiment of the present invention that correlates a sample point against the area of a reference basket as represented by a reference basket array using a MAD correlation technique. In one embodiment, the method of FIG. 4 is implemented by correlation function 143. The method of FIG. 4 determines the difference between the $Alt_m$ value of the sample point and the $Alt_m$' values contained in the reference basket array, and subsequently identifies the element having the minimum absolute deviation within the reference basket array. The element having the minimum absolute deviation corresponds to the predicted (that is, the most probable) navigator position relative to the reference basket area. It is understood that the method of FIG. 4 illustrates just one of many possible algorithms for identifying a most probable navigator position based on minimum absolute deviation that are embodied within the claims of the present invention.

The method begins at 402 with receiving a sample point (latitude, longitude, $Alt_m$) and incrementing a sample point counter (n) by one (shown at 404). The method implements two indexing loops that step the method through each element of a rectangular reference basket array having dimensions of x elements by y elements. As previously mentioned, embodiments of the present invention are not limited to rectangular reference basket area but include methods that correlate a sample point against non-rectangular reference baskets.

The first loop (shown starting a block 406) steps the method by increasing index value i from 1 to x, where x is equal to the number of columns of the reference basket array. The second loop (shown starting a block 408) steps the method by increasing index value j from 1 to y, where y is equal to the number of rows of the reference basket array. The method proceeds to 410 with computing the difference between the value of $Alt_m$'(i,j) of the reference basket array and the $Alt_m$ value from the sample point received at block 402 (shown as difference[$Alt_m$−$Alt_m$'(i,j)] in block 410).

The method proceeds to block 412 with determining a correlation value minimum absolute deviation for each element of the reference basket array. In one embodiment, at 412, the method calculating the correlation value minimum absolute deviation using the equation correlation_value_MAD(i,j)=correlation_value_MAD(i,j)+absolute_value(difference[$Alt_m$−$Alt_m$'(i,j)]−bias_constant).

The minimum correlation value minimum absolute deviation calculated corresponds to the most probable navigator position relative to the reference basket area. Accordingly, the method of FIG. 4 proceeds to 414 with determining whether the correlation_value_MAD (i,j) value for the current index position (i,j) is the minimum value calculated so far. In one embodiment, when the correlation_value_MAD (i,j) value for the current index position (i,j) is the minimum value calculated so far, the method sets the value of variable minimum_cell_x equal to the current value of i, and the value of variable minimum_cell_y equal to the current value of j (shown at block 416). The method then loops back to 408 and 406, incrementing the index values of j and i, respectively and repeating steps 410, 412, 414 and 416 until the first loop is completed.

After completing the first and second loops, the resulting values of minimum_cell_x and minimum_cell_y identify the elements of the reference basket array that most probably represents the navigator position relative to the reference basket area, based on the correlation of n sample points. Whether these resulting values should be used for computing a position error depends on the quality of the correlation. If the correlation quality is sufficient (determined at block 420) then the values of minimum_cell_x and minimum_cell_y are used to calculate a position error as shown in FIG. 3, discussed in further detail above. If the correlation quality is not sufficient, then further correlation with another sample point is required. In the latter case, the method returns to 402 with receiving another sample point (latitude, longitude, $Alt_m$), incrementing the value of n by one (at 404) and repeating the process of loops 406 and 408. Note that the same reference basket area and reference basket array are used for calculation of the first and any second, third, and subsequent correlations until a satisfactory correlation is achieved. Further, the values of correlation_value_MAD(i,j) are not reset until a satisfactory correlation is achieved. Whether a particular correlation is of satisfactory quality is readily determined by one of ordinary skill in the art upon reading this specification based on the particular accuracy required to satisfy the goals and mission of the aircraft.

Several means are available to implement the systems and methods of the current invention as discussed in this specification. These means include, but are not limited to, digital computer systems, microprocessors, programmable controllers and field programmable gate arrays. Therefore other embodiments of the present invention are program instructions resident on computer readable media which when implemented by such controllers, enable the controllers to implement embodiments of the present invention. Computer readable media include any form of computer memory, including but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A terrain contour matching navigation system for an aircraft, the system comprising:
    an inertial navigation system configured to output a navigation solution including a horizontal position of the aircraft and a vertical inertial altitude of the aircraft;
    a clearance altimeter configured to output a clearance altitude of the aircraft above a terrain;
    a memory programmed with a contour map; and
    a processor coupled to the inertial navigation system, the clearance altimeter and the memory;
    wherein the processor is programmed with a reference basket selector to select a reference basket area from the memory;
    wherein the processor is programmed to calculate a first single sample point comprising the horizontal position of the aircraft and an altitude sample, the altitude sample based on a difference between the vertical inertial altitude and the clearance altitude;
    wherein the processor is programmed with a correlation function that correlates the first single sample point over the reference basket area to determine a position in the reference basket area corresponding to a predicted position of the aircraft and further determine a correlation quality;
    wherein when the correlation quality does not achieve a pre-determined quality threshold, the processor is programmed to calculate an additional sample point and the correlation function correlates the additional sample point over the reference basket area to determine the position in the reference basket area corresponding to the predicted position of the aircraft and further determine the correlation quality; and
    wherein when the correlation quality does achieve a pre-determined quality threshold, the processor is programmed with a position error output function that calculates a horizontal position error and vertical position error based on the position in the reference basket area corresponding to the predicted position of the aircraft.

2. The system of claim 1, wherein the reference basket selector is configured to select a reference basket area that includes an area of the contour map based on the navigation solution output of the inertial navigation system and an uncertainty in the horizontal position of the navigation solution.

3. The system of claim 2, wherein the inertial navigation system further comprises a Kalman filter configured to output quality data that represent the uncertainty in the navigation solution; and
    wherein the reference basket selector is configured to select a reference basket area further based on the quality data from the Kalman filter.

4. The system of claim 1, wherein the correlation function performs a correlation based on at least one of a minimum variance technique and a minimum absolute deviation technique.

5. The system of claim 1, wherein the processor is further configured to output a correction factor based on the horizontal position error and the vertical position error; and
    wherein the inertial navigation system is configured to receive the correction factor and determine the navigation solution based on the correction factor.

6. A method for terrain contour matching navigation, the method comprising:
    receiving at least one sample point representing the position of an aircraft, the at least one sample point including a horizontal position and an altitude sample;
    correlating a first sample point of the at least one sample point across a reference basket array having a plurality of elements;
    determining a correlation quality;
    when the correlation quality does not achieve a pre-determined quality threshold, performing at least one additional correlation of an additional sample point of the at least one sample point across the reference basket array; and
    when the correlation quality does achieve a pre-determined quality threshold, calculating a position error based on the correlating of the first sample point and any additional correlations of any additional sample points, wherein calculating the position error comprises:
    determining a column number and a row number of an element of the reference basket array having the smallest correlation value;
    calculating a first horizontal position error $\Delta x$ based on the equation:
    $\Delta x = (\text{minimum\_cell\_x} - (x+1)/2) * \text{basket\_cell\_size\_x}$;
    and calculating a second horizontal position error $\Delta y$ based on the equation:
    $\Delta y = (\text{minimum\_cell\_y} - (y+1)/2) * \text{basket\_cell\_size\_y}$;
    wherein minimum_cell_x is based on the column number of the element of the reference basket array having the smallest correlation value, minimum_cell_y is based on the row number of the element of the reference basket array having the smallest correlation value, x is based on a number of columns of the reference basket array, y is based on a number of rows of the reference basket array, and basket_cell_size_x and basket_cell_size_y are based on dimensions of a physical area represented by a single element of the reference basket array.

7. The method of claim 6, further comprising selecting a reference basket area from a contour map based on the horizontal position and an uncertainty in the horizontal position, wherein the reference basket array is based on the reference basket area.

8. The method of claim 6, wherein the altitude sample represents a difference between a vertical inertial altitude based on sensor data and a clearance altitude based on sensor data, and
wherein the horizontal position represent a longitude position based on sensor data and a latitude position based on sensor data.

9. The method of claim 6, wherein correlating a first sample point across a reference basket array further comprises:
determining a difference between the altitude sample and altitude values contained in the reference basket array;
determining a correlation value for each of the plurality of elements of the reference basket array based on the difference between the altitude sample and altitude values contained in the reference basket array; and
determining which element of the reference basket array has the smallest correlation value.

10. The method of claim 9, wherein determining a correlation value further comprises performing a sequential computation to determine a correlation value based on a standard deviation for each element of the reference basket array.

11. The method of claim 10, wherein determining a correlation quality further comprises determining whether a standard deviation associated with an element of the reference basket array having the smallest correlation value achieves a predetermined threshold.

12. The method of claim 9, wherein determining a correlation value further comprises:
performing a sequential computation to determine a correlation value minimum absolute deviation (MAD) for each element of the reference basket array.

13. The method of claim 9, wherein determining a correlation quality further comprises:
evaluating a correlation surface representing correlation values associated with each element of the reference basket array to determine if a slope of the correlation surface in a region of the reference basket array having the smallest correlation value achieves a predetermined threshold.

14. The method of claim 6, wherein calculating a position error further comprises calculating a vertical position error $\Delta z$ based on the equation:
$\Delta z = \text{difference\_sum}(\text{minimum\_cell\_x} \ \text{minimum\_cell\_y})/n$;
wherein n equals a total number of samples points correlated across the reference basket array.

15. A terrain contour matching navigation system for an aircraft, the system comprising:
a first sensing means for determining a horizontal position and an inertial altitude of the aircraft;
a second sensing means for determining a clearance altitude of the aircraft;
means for processing responsive to the first sensing means and the second sensing means, wherein the means for processing is configured to determining at least one sample point based on the horizontal position and a difference between the clearance altitude and the inertial altitude; and
means for storing a reference basket array having a plurality of elements, wherein each element includes an altitude value based on a contour map;
wherein the means for processing is further configured to correlate a first single sample point of the at least one sample point across the reference basket array and determine an element of the reference basket array having a smallest correlation value;
wherein the means for processing is farther configured to determine whether a correlation quality achieves a predetermined quality threshold by evaluating a correlation surface representing correlation values associated with each element of the reference basket array to determine if a slope of the correlation surface in a region of the reference basket array having the smallest correlation value achieves the predetermined quality threshold;
wherein when the correlation quality does not achieve the pre-determined quality threshold, the means for processing is further configured to perform at least one additional correlation of an additional single sample point of the at least one sample point across the reference basket array; and
wherein when the correlation quality does achieve the predetermined quality threshold, the means for processing is further configured to calculate a position error based on the correlating of the first single sample point and any additional correlations of any additional single sample points.

16. The system of claim 15, wherein the means for processing is further configured to select the reference basket array from the means for storing, wherein the reference basket array represents an area of the contour map based on the horizontal position determined by the first sensing means and an uncertainty in the horizontal position.

17. The system of claim 15, wherein the means for processing is further configured to compute a correlation that determines an element of the reference basket array having a smallest correlation value based on at least one of a minimum variance technique and a minimum absolute deviation technique.

18. The system of claim 15, wherein the means for processing is configured to output a correction factor based on the position error.

19. The system of claim 18, wherein the first sensing means is configured to receive the correction factor and further determine the horizontal position and the inertial altitude of the aircraft based on the correction factor.

* * * * *